April 30, 1968  G. CREMER ET AL  3,380,128

APPARATUS FOR PRODUCING CERAMIC BODIES

Filed April 14, 1966

INVENTORS
GOTTFRIED CREMER
HEINZ BEHRENS
HANS-JOACHIM DIETZSCH

BY MALCOLM W. FRAZE

United States Patent Office 3,380,128
Patented Apr. 30, 1968

3,380,128
APPARATUS FOR PRODUCING
CERAMIC BODIES
Gottfried Cremer and Heinz Behrens, Junkersdorf, Germany, and Hans-Joachim Dietzsch, Villars-sur-Ollon, Switzerland, assignors to Schneider & Co., Frechen, Germany, a German firm
Filed Apr. 14, 1966, Ser. No. 542,700
Claims priority, application Germany, Apr. 15, 1965, B 81,490
3 Claims. (Cl. 25—17)

ABSTRACT OF THE DISCLOSURE

Apparatus for producing a ceramic body having parallel channels extending from end to end in which a die plate is arranged at the end of the extruder and has a plurality of spaced orifices opening into a chamber. Disposed forwardly of each orifice is a masking member and the several masking members are spaced laterally from each other and from the walls of the chamber. The cross section of the space between the die plate orifices exceeds the cross section of the space between adjacent masking members and between the masking members and the chamber walls. The masking members are spaced from the die plate orifices by pins disposed about the periphery of each member or by a sleeve having a masking member at one end and connected to an orifice at the other end and having lateral openings.

---

Figure 1:
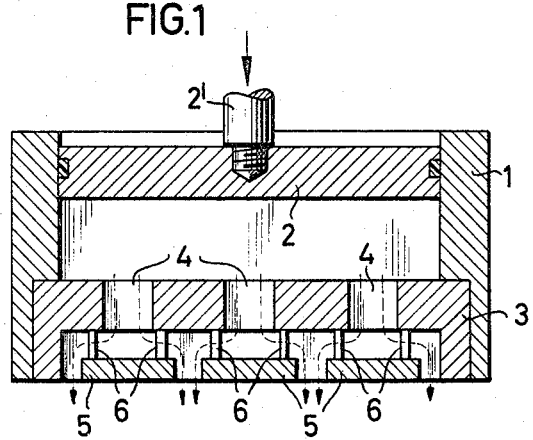

This invention relates to apparatus for the production of ceramic bodies traversed from one side to the other by parallel channels.

Such ceramic bodies are usually produced on an extrusion or similar press provided inside its die with a number of cores which form the parallel channels extending from one side to the other as the ceramic material is squeezed through the die orifice.

It has also been proposed to provide, inside the mouthpiece of such a press, a supporting structure resembling a honeycomb and to set back the walls of the honeycomb subdivisions of the supporting structure at the end adjacent the mouth of the press to create a small gap so that the material entering this structure from the inside of the press emerges from openings provided in the part of the supporting structure adjacent the mouth of the press into these gaps to flow therethrough to the discharge end of the press.

The present invention proposes an arrangement which permits the same effect to be achieved by providing the press with a mouthpiece of substantially simpler construction.

To this end the invention is based upon an arrangement for the production of ceramic bodies traversed from one side to the other by parallel channels, comprising a multi-orificed dieplate which forms the closure in the mouth of an extrusion press.

According to the invention the orifices in the dieplate are masked on the outside of the dieplate by relatively spaced masking members which are also spaced sufficiently far away from the face of the dieplate for the cross-section of the transverse flow passages which are thus created in a direction normal to extruding direction between the masking members and the dieplate to exceed the cross-section of flow available between the masking members.

In the described form of construction the extruded ceramic material is first deflected out of the direction in which the extruding pressure is applied to flow sideways through the space left between the masking members and the dieplate and then to be redeflected back into the original direction in which the extruding pressure acts. Surprisingly the creation of the textures which unavoidably appear in finished ceramic bodies when extruded from normal dies with inserted cores is thus completely avoided. Moreover, the proposed device compares favorably with the above described arrangement comprising the honeycomb supporting structure in that it is very much simpler and yet affords the same advantages that can be obtained with the latter arrangement.

Preferably a masking member is provided facing each orifice and attached to the dieplate by a plurality of spacing elements disposed around the periphery of the masking member. In the simplest case these spacing elements may just be pins.

However, in a further development of the invention each masking element may conveniently be attached to a hollow insert provided on the side of the masking member facing the dieplate with lateral openings. The hollow inserts may be attached to the dieplate in any desired manner, for instance in that the inserts completely penetrate the dieplate to be secured thereto on the inside. In such an arrangement the orifices in the dieplate may preferably be flared towards the inside of the press so that after the inserts have been fitted into the orifices from the outside their inner ends slightly project from or are flush with the inside of the dieplate, permitting them to be expanded into the conically flared rear ends of the orifices.

Naturally the outer ends of the orifices in the dieplate may be tapped for screwing the threaded rear end of the insert into the same. This arrangement also permits the spacing of the masking members in relation to the face of the dieplate to be adjustably varied by screwing them more or less deeply into the dieplate.

In order to avoid the creation of an open annular recess between the threaded end of the insert and the bottom of the tapped part of the orifice in the dieplate, a further optional feature of the invention consists in the provision of an internal lining bush inside the orifice for covering the portion of the orifice containing the end of the insert.

Figure 2:
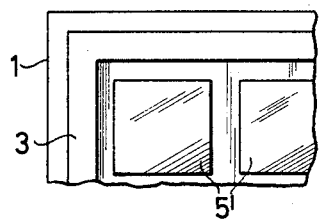
Figure 2A:
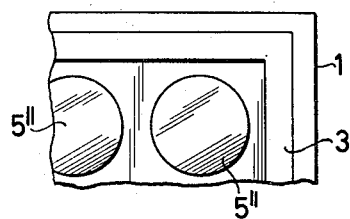
Figure 3:
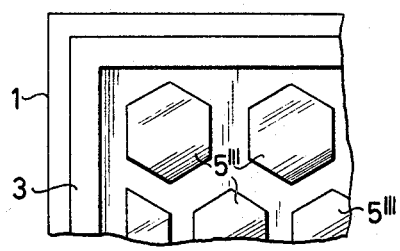
Figure 3A:
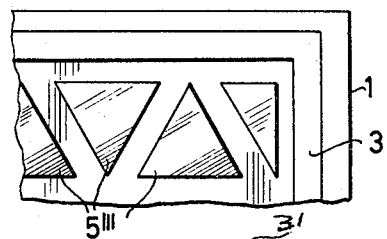
Figure 4:
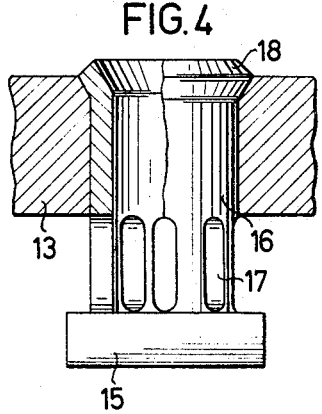
Figure 5:
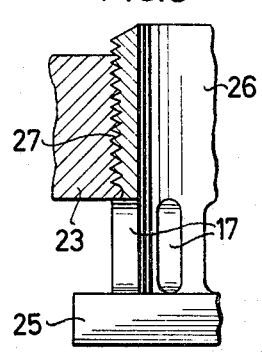
Figure 5A:
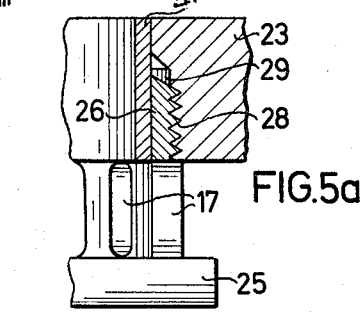

The invention will now be described in greater detail, by way of example, with reference to the accompanying drawing in which FIGURE 1 is a section of an extrusion press with an orificed dieplate and masking members facing the orifices on the outside, FIGURE 2 is a fragmentary view of the dieplate from underneath fitted with masking members shown with a square contour, FIGURE 2a is a fragmentary view of the dieplate from underneath fitted with masking members shown with a circular contour, FIGURE 3 is a fragmentary view of a press according to FIGURE 1 from the underside, showing hexagonal masking members, FIGURE 3a is a fragmentary view of a press according to FIGURE 1 from the underside, showing triangular masking members, FIGURE 4 is a fragmentary section of a masking member attached to a hollow insert, and FIGURE 5 is a fragmentary sectional view of a masking element attached to a hollow insert adapted to be threadedly fitted into the dieplate, and FIGURE 5a is a fragmentary sectional view of another form of masking element.

In FIGURE 1 there is provided inside a container 1 a ram piston 2 which can be advanced and retracted by a rod 2′. The die in this container 1 is formed by a plate 3 which is inserted into the open container end and secured therein by suitable means. The plate is provided with orifices 4 which are covered by masking members 5 on the outside of the plate and in the illustrated embodiment attached to the plate 3 by spacers 6. The paths taken by the ceramic composition when the ram 2 squeezes the same downwards out of the container 1 are indicated by chain line arrows.

FIGURE 2 is a view of the extruder according to FIGURE 1 seen from below, illustrating a form of construction in which the masking members 5' are square in plan, whereas FIGURE 2a shows an arrangement in which the masking members 5'' are circular.

Similarly FIGURE 3 shows masking members 5''' of hexagonal contour, whereas FIGURE 3a represents masking members 5'''' which in plan are triangular.

Naturally the illustrated geometrical configurations are merely examples which can be modified as may be desired and masking members having irregular contours would also be feasible. The shape of the masking members 5 will always be determined by the cross-section of the channels which are desired to traverse the ceramic body from one side to the opposite side.

FIGURE 4 shows an embodiment in which each masking member 15 is attached to a hollow insert 16 provided above the masking member 15 with lateral openings 17.

In the arrangement according to FIGURE 4 the insert 16 which carries the masking member 15 completely penetrates the plate 13 and is secured at the upper side of the plate by having its upper end flared as shown at 18.

In the embodiment according to FIGURE 5 the insert 26, which at its bottom end carries a masking member 25 in a manner similar to the insert 16, is screwed into plate 23.

In the form of construction exemplified in the left-hand half of FIGURE 5 the threaded end 27 of the insert 26 completely penetrates the plate 23 and projects a little from the inside of the plate.

In the embodiment shown in FIGURE 5a the threaded part 28 of the insert is screwed into a tapped hole 29. In order to prevent material from squeezing into the cavity remaining between the end of the thread 28 and the bottom of the tapped hole, the arrangement shown in FIGURE 5a includes the provision of a lining bush 31.

What we claim is:

1. Apparatus for producing a ceramic body having parallel channels extending from end to end, said apparatus comprising a die plate providing the terminal portion of an extrusion press through which ceramic material in plastic form is forced, said die plate having a plurality of laterally spaced orifies and a chamber into which said orifices open, a masking member directly in advance of each orifice and each masking member being spaced from an adjacent masking member and from the walls of said chamber and means for spacing each masking member outwardly from its respective orifice, enabling ceramic materials from said orifice to pass transversely back of each masking member and then outwardly entirely around same and pass from said die plate through the space between adjacent masking members and between the masking members and the walls of said chamber, the cross section of the space between the masking members and said orifices exceeding the cross section of the space between the individual masking members and between the masking members and the walls of said chamber.

2. Apparatus according to claim 1, in which the spacing means for each masking member comprises a plurality of pins disposed about the periphery thereof and about which ceramic material flows.

3. Apparatus according to claim 1, comprising a sleeve for each masking member and to the outer end of which such masking member is disposed, and means for connecting the inner end of each sleeve within an orifice in said die plate, each sleeve between said masking member and the respective die plate orifices having a plurality of lateral openings.

References Cited

UNITED STATES PATENTS

| | | | |
|---|---|---|---|
| 1,725,959 | 8/1929 | Heath | 25—17 |
| 1,738,665 | 12/1929 | Ober | 25—17 |
| 1,849,431 | 3/1932 | Mayhew | 25—17 |
| 1,976,858 | 10/1934 | Ritter | 25—17 |
| 2,708,772 | 5/1955 | Monerieff | 18—14 X |
| 2,908,037 | 10/1959 | Harkenrider | 25—17 X |
| 3,024,494 | 3/1962 | Szpila | 25—17 X |
| 3,038,201 | 6/1962 | Harkenrider | 18—12 X |
| 3,122,790 | 3/1964 | Albert | 18—14 |
| 3,176,343 | 4/1965 | Calaway et al. | 18—8 |
| 3,286,661 | 11/1966 | Bundschuh | 18—12 X |

WILLIAM J. STEPHENSON, *Primary Examiner.*